United States Patent [19]
Kjellqvist

[11] Patent Number: 5,360,175
[45] Date of Patent: Nov. 1, 1994

[54] REFINER HAVING OSCILLATION REDUCTION MEANS

[75] Inventor: Olof G. Kjellqvist, Sundsvall, Sweden

[73] Assignee: Sunds Defibrator Industries Aktiebolag, Sweden

[21] Appl. No.: 122,516

[22] PCT Filed: Jan. 28, 1992

[86] PCT No.: PCT/SE92/00050
§ 371 Date: Sep. 27, 1993
§ 102(e) Date: Sep. 27, 1993

[87] PCT Pub. No.: WO92/17637
PCT Pub. Date: Oct. 15, 1992

[30] Foreign Application Priority Data
Mar. 27, 1991 [SE] Sweden ............... 9100922

[51] Int. Cl.$^5$ ................................. B02C 7/06
[52] U.S. Cl. ....................... 241/261.2; 241/260
[58] Field of Search ............ 241/244, 250, 251, 253, 241/257.1, 258, 259, 259.1, 259.2, 259.3, 260, 261.2; 74/5.5, 574

[56] References Cited
U.S. PATENT DOCUMENTS

| | | |
|---|---|---|
| 3,776,079 | 12/1973 | Steinberg et al. ............ 241/245 X |
| 4,061,279 | 12/1977 | Sautter . |
| 4,082,139 | 4/1978 | Davis . |
| 4,379,707 | 4/1983 | Fisher . |
| 4,773,602 | 9/1988 | Rössler .................. 241/261.1 X |
| 5,195,684 | 3/1993 | Radzins .................. 241/261.1 X |

*Primary Examiner*—Timothy V. Eley
*Attorney, Agent, or Firm*—Lerner, David, Littenberg, Krumholz & Mentlik

[57] ABSTRACT

A refiner for the manufacture of cellulose pulp where the raw material is processed in a gap between two opposed refining members rotary relative one another, and where at least one of the refining members is supported on a rotary refiner shaft (2) driven by a motor (4). An intermediate shaft (3) is connected non-rotary to a first and, respectively, second coupling (6 and, respectively, 7) between the rotor shaft (5) of the motor (4) and the refiner shaft (2) for transferring the drive moment. For damping the torsion oscillations in the mechanically connected shafts (2, 3, 5), an outer pipe (8) stiff against torsion is provided concentrically with the intermediate shaft (3), and one end of the pipe (8) is rigidly connected to the first coupling (6) at one end of the intermediate shaft, and the other end of the pipe (8) is connected by means of a friction damper (9) to the second coupling (7) at the other end of the intermediate shaft.

14 Claims, 2 Drawing Sheets

REFINER HAVING OSCILLATION REDUCTION MEANS

FIELD OF THE INVENTION

The present invention relates to refiners. More particularly, the present invention relates to refiners for manufacturing cellulose pulp. Still more particularly, the present invention relates to such refiners in which the raw material, such as wood chips, bagasse, fiber suspensions and the like, is processed in a gap between two opposed refining members which are relatively rotatable with respect to each other. Still more particularly, the present invention relates to such refiners in which at least one of the refining members is supported on a rotary refiner shaft driven by a motor, and in which an intermediate shaft is coupled in a non-rotary fashion between the rotor shaft of the motor and the refiner shaft.

BACKGROUND OF THE INVENTION

During start-up of refiners of the type described above, the driving motor, which is generally a synchronous motor, creates rather strong oscillating moments. These oscillations pass through a resonance frequency of the mechanically coupled shafts immediately before the working number of revolutions, or the synchronous speed, has been achieved. The excitation moment from the synchronous motor increases substantially during this passage through the resonance frequency, and the maximum moment which develops can exceed about 200 kNm. In view of the magnitude of the maximum moment, the refiner must be overdimensioned in relation to what is required during the other refiner operation conditions.

The present invention solves this problem in that the oscillation moment can be reduced to a level close to that during normal operation conditions.

SUMMARY OF THE INVENTION

These and other objects have now been accomplished by providing a refiner for the treatment of cellulose-containing material between a pair of opposed, relatively rotatable refining members, at least one of which is rotatably supported on a refiner shaft, in which the refiner includes a motor, a rotor shaft driven by the motor, an intermediate shaft interposed between the refiner shaft and the rotor shaft for transferring the drive moment therebetween, a first coupling member rigidly connecting one end of the intermediate shaft to the rotor shaft, a second coupling member rigidly connecting the other end of the intermediate shaft to the refiner shaft, outer pipe means concentrically disposed about the intermediate shaft for providing stiffness against torsion created in the refiner, the outer pipe means interconnecting the first and second coupling members, and friction damper means interposed between one end of the outer pipe means and at least one of the first and second coupling members, whereby oscillations in the refiner are reduced thereby.

In accordance with one embodiment of the refiner of the present invention, the other end of the outer pipe means is rigidly connected to the other of the first and second coupling members. In a preferred embodiment the outer pipe means has a first degree of rigidity and the intermediate shaft has a second degree of rigidity, the first degree of rigidity being from 3 to 15 times greater than the second degree of rigidity, preferably from 8 to 10 times greater than the second degree of rigidity.

In accordance with one embodiment of the refiner of the present invention, the friction damper means includes at least two friction surfaces in direct contact with each other. Preferably, the friction damper means is arranged so that these at least two friction surfaces begin to slide relative to each other at a torque of between about 30 and 100 percent of the effective output of the motor at full load.

In accordance with a preferred embodiment of the refiner of the present invention, the friction damper means includes radial brake disk means projecting radially from the first end of the outer pipe means, brake block means in frictional contact with the radial brake disk means, and tightening means for urging the brake block means against the radial brake disk means. Preferably, the brake block means comprises a pair of brake blocks on either side of the radial brake disk means. In another embodiment the tightening means can be mechanical or hydraulic tightening means, preferably mechanical tightening means such as spring means.

In accordance with another embodiment of the refiner of the present invention, one of the friction surfaces comprises one of the first and second coupling members, and the refiner includes brake block means in frictional contact with that first or second coupling member and pressing means for pressing the brake block means into frictional contact therewith.

In accordance with another embodiment of the refiner of the present invention, one of the two friction surfaces comprises one of the first and second coupling members, the outer pipe means includes a sleeve portion in frictional contact with the first or second coupling member, and the refiner includes tightening means for urging the sleeve portion against the first or second coupling member. In a preferred embodiment the tightening means comprises a pressurized oil gap extending about the sleeve portion of the outer pipe means.

It is thus apparent that according to the present invention the portional oscillations are damped by providing a friction damper between the motor and refiner shafts. In accordance with this invention, the design of this refiner is simple and includes few parts, which makes it relatively cheap and easy to install in existing refiners. In addition, the function of this device is independent of other drive or control means.

BRIEF DESCRIPTION OF THE DRAWINGS

The present invention may be more fully understood with reference to the following detailed description, which refers to the Figures, in which.

DETAILED DESCRIPTION

Figure 1:
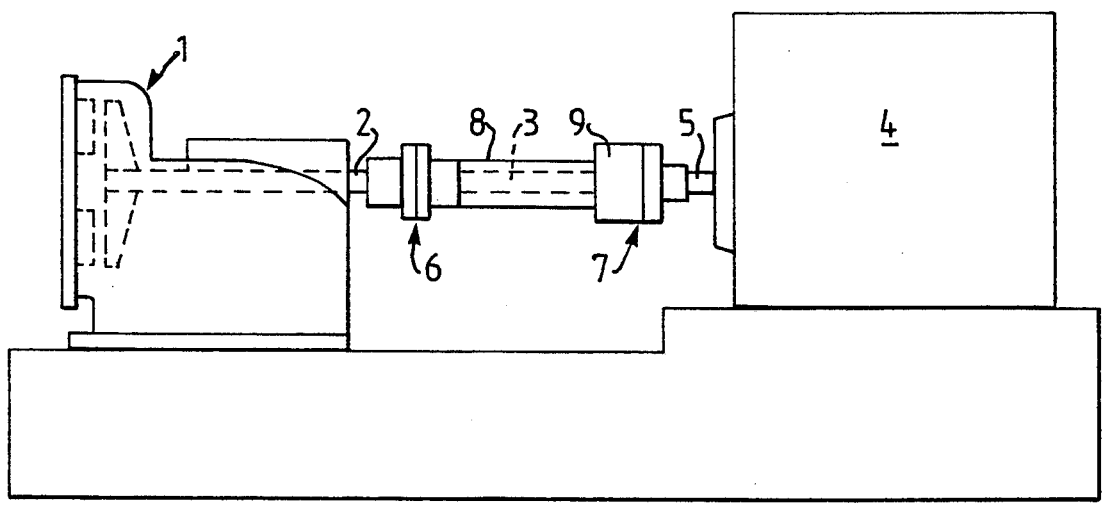
FIG. 1 is a side, elevational, partially phantom view of a refiner including a drive motor in accordance with the present invention.
Figure 2:
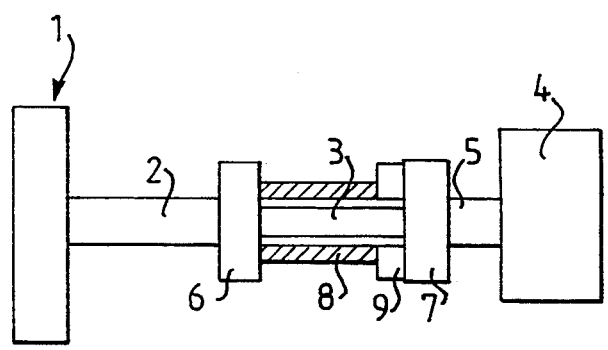
FIG. 2 is a side, elevational, partially sectional, schematic view of the coupling principle between the motor and the refiner according to the present invention.

Referring to the Figures, in which like reference numerals refer to like elements thereof, FIG. 1 shows a refiner of the single-disk type; i.e., in which one refining member is stationary and the other is rotary. The rotary refining member is located on a refiner shaft 2, which is coupled to the rotor shaft 5 of the motor through an intermediate shaft 3, by means of first and second coupling members 6 and 7, respectively. The motor is a synchronous motor which maintains a constant speed during operation irrespective of the shaft moment. This is essential for the refining of cellulose material. The motor output can vary between 1 and 20 MW or more, depending on the refiner type. For use in these refiners, the synchronous motor normally has four poles, providing the motor with a synchronous speed of 1500 and 1800 rpm at 50 and 60 cps, alternating current frequency, respectively.

The intermediate shaft 3 connecting the motor 4 to the refiner 1 is preferably coupled by a bolt joint for taking up axial moments. The intermediate shaft 3 has the objects of both lowering the neutral frequency of the system at which the resonance amplitudes are lower, and acting as a safety device during breakdowns.

An outer pipe 8 which is stiff against torsion is provided concentrically about the intermediate shaft 3. One end of this outer pipe 8 is rigidly connected to the first coupling member 6 at one end of the intermediate shaft 3. The other end of the pipe 8 is connected by a friction damper 9 to the second coupling member 7 at the other end of the intermediate shaft 3.

The friction damper 9 comprises friction surfaces which are pressed against each other. This results in the strong torsion oscillations which arise during passage through the resonance frequency being removed as friction energy between the friction surfaces of the friction damper.

During start-up of a refiner, increasing torsion oscillations generally arise after a few seconds due to resonance. At the point where the torque increases to a magnitude which causes the friction surfaces to start sliding relative to one another (i.e., the tear-off moment), an increase in torque is prevented. Due to these torsion oscillations, repeated such sliding movement takes place thereafter forth and back in the friction damper while heat is simultaneously developing. After several seconds, the resonance is passed, and the torsion oscillations cease.

By using a friction damper of this kind, it has now been found possible, for example, to reduce the maximum torque at the start-up of a refiner from 210 kNm down to 80 kNm. By optimizing the equipment, it should be possible to reduce the maximum torque even further.

The parameters which define the function of the friction damper include the tear-off moment, the friction moment, and the rigidity of the intermediate shaft. A suitable size of the tear-off moment is between about 30 and 100% of the effective output of the motor at full load. The diameter of the intermediate shaft is determined on the basis of the transferred moment. By selecting a suitable length for the intermediate shaft, a desired angle of distortion between the couplings can thus be obtained.

With a motor output of 15 MW it has been found suitable to have a tear-off moment of from about 20 to 50 kNm, preferably from about 30 to 40 nKm. The friction moment normally amounts to about 60% of the tear-off moment. The total friction area should be between about 0.2 and 0.5 m², preferably between about 0.3 and 0.4 m². The rigidity of the intermediate shaft 3 should be between about 1.2 and 3.2 MNm/line, preferably between about 2.0 and 3.0 MNm/line. It can be dimensioned for a maximum moment during start-up of about 80 kNm. In so dimensioning, regard must be paid to the heat developed due to friction. A lower tear-off moment and a lower rigidity of the intermediate shaft will thus result in an increased development of heat.

The outer pipe 8 which provides stiffness against torsion, has a rigidity which substantially exceeds the rigidity of the intermediate shaft, and preferably a rigidity of from 3 to 15 times and preferably of from 8 to 10 times higher than that of the intermediate shaft.

Figure 3:
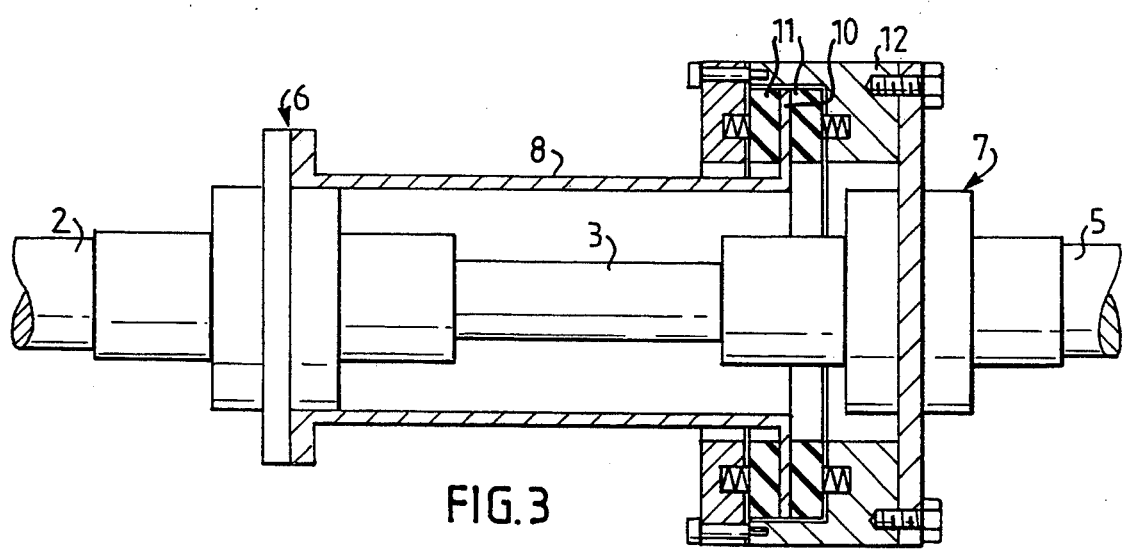
FIG. 3 is a side, elevational, partially sectional view of a friction damper in accordance with the present invention.

Referring next to the embodiment shown in FIG. 3, the torsion damping in this case is achieved by means of a brake disk 10, which is connected to the pipe 8 stiff against torsion, and is held by spring-loaded brake blocks 11, which, in turn, are located in a yoke 12 on the second coupling member 7. The friction surface is oriented substantially radially. By selection of the spring-load and the brake disk diameter, the damping effect can be determined entirely independent of other operational data in order to bring about a desired damping. Instead of a spring-loaded device, other mechanical or hydraulic tightening devices can be utilized.

Figure 4:
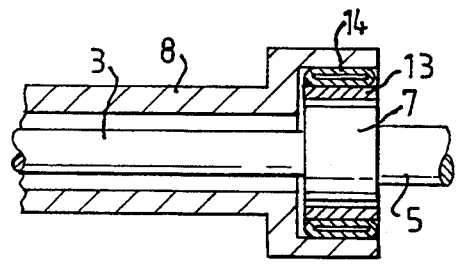
FIG. 4 is a partial, side, elevational, partially sectional view of another friction damper in accordance with the present invention.

Referring to FIG. 4, the friction moment in this case is produced by external brake blocks 13, which are pressed against the second coupling member 7 by means of a bellows 14, which expands by pressurizing an incompressible fluid in the bellows. Alternatively, mechanical tightening can be provided. The friction surface in this case is axially oriented. According to other alternatives (not shown), the friction surfaces can also be arranged at various angles between radial and axial.

Figure 5:
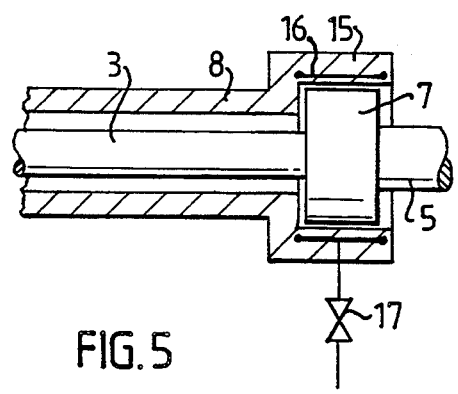
FIG. 5 is a partial, side, elevational, partially sectional view of another friction damper in accordance with the present invention.

Referring to FIG. 5, the friction moment in this case is produced by means of a sleeve 15 composite with the pipe 8 and having an oil gap 16 extending thereabout. Sleeve 15 extends about the second coupling member 7 so as to form a friction surface between them. tightening in this case is thus effected by hydraulic pressure in the oil gap 16 through valve 17. This design can easily be made rigid. It comprises few parts, has little inertia mass, and the friction moment can be easily adjusted.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A refiner for the treatment of cellulose-containing material between a pair of opposed, relatively rotatable refining members, at least one of said refining members being rotatably supported on a refiner shaft, said refiner comprising a motor, a rotor shaft driven by said motor, an intermediate shaft having a first end and a second end interposed between said refiner shaft and said rotor shaft for transferring the drive moment therebetween, a first coupling member rigidly connecting said first end of said intermediate shaft to said rotor shaft, a second coupling member rigidly connecting said second end of said intermediate shaft to said refiner shaft, outer pipe means having a first end and a second end concentrically disposed about said intermediate shaft for providing stiffness against torsion created in said refiner, said outer pipe means interconnecting said first and second coupling members, and friction damper means interposed between said first end of said outer pipe means and at least one of said first and second coupling members whereby oscillations in said refiner are reduced thereby.

2. The refiner of claim 1 wherein said second end of said outer pipe means is rigidly connected to said other of said first and second coupling members.

3. The refiner of claim 1 wherein said outer pipe means has a first degree of rigidity and said intermediate shaft has a second degree of rigidity, said first degree of rigidity being from 3 to 15 times greater than said second degree of rigidity.

4. The refiner of claim 3 wherein said first degree of rigidity is from 8 to 10 times greater than said second degree of rigidity.

5. The refiner of claim 1 wherein said friction damper means includes at least two friction surfaces in direct contact with each other.

6. The refiner of claim 5 wherein said friction damper means is arranged so that said at least two friction surfaces begin to slide relative to each other at a torque of between about 30 and 100% of the effective output of said motor at full load.

7. The refiner of claim 5 wherein said friction damper means includes radial brake disk means projecting radially from said first end of said outer pipe means, brake block means in frictional contact with said radial brake disk means, and tightening means for urging said brake block means against said radial brake disk means.

8. The refiner of claim 7 wherein said brake block means comprises a pair of brake blocks on either side of said radial brake disk means.

9. The refiner of claim 7 wherein said tightening means is selected from the group consisting of mechanical tightening means and hydraulic tightening means.

10. The refiner of claim 9 wherein said tightening means comprises mechanical tightening means.

11. The refiner of claim 10 wherein said mechanical tightening means comprises spring means.

12. The refiner of claim 5 wherein one of said at least two friction surfaces comprises said at least one of said first and second coupling members, and including brake block means in frictional contact with said at least one of said first and second coupling members, and pressing means for pressing said brake block means into frictional contact with said at least one of said first and second coupling members.

13. The refiner of claim 5 wherein one of said at least two friction surfaces comprises said at least one of said first and second coupling members, said outer pipe means includes a sleeve portion in frictional contact with said at least one of said first and second coupling members, and including tightening means for urging said sleeve portion against said at least one of said first and second coupling members.

14. The refiner of claim 13 wherein said tightening means comprises a pressurized oil gap extending about said sleeve portion of said outer pipe means.

* * * * *